United States Patent
Kim et al.

(10) Patent No.: US 8,340,519 B2
(45) Date of Patent: Dec. 25, 2012

(54) PASSIVE OPTICAL NETWORK COMPRISING AN OPTICAL BURST MODE RECEIVER

(75) Inventors: Jaedon Kim, Santa Clara, CA (US); Jin-Woo Cho, Stanford, CA (US); Leonid G. Kazovsky, Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 714 days.

(21) Appl. No.: 12/123,108

(22) Filed: May 19, 2008

(65) Prior Publication Data

US 2009/0285581 A1    Nov. 19, 2009

(51) Int. Cl.
*H04B 10/00* (2006.01)
(52) U.S. Cl. .......................... 398/72; 398/100; 398/202
(58) Field of Classification Search ............... 398/66–72, 398/202, 100
See application file for complete search history.

(56) References Cited

U.S. PATENT DOCUMENTS

| | | | |
|---|---|---|---|
| 5,299,044 A * | 3/1994 | Mosch et al. ................... | 398/35 |
| 6,785,344 B1 * | 8/2004 | Jiang et al. ..................... | 375/317 |
| 7,548,694 B2 * | 6/2009 | Kazawa et al. ................. | 398/67 |
| 7,583,898 B1 * | 9/2009 | Dalton et al. .................. | 398/100 |
| 7,680,414 B2 * | 3/2010 | Kazawa et al. ................. | 398/67 |
| 7,925,164 B2 * | 4/2011 | Sitton et al. .................... | 398/72 |
| 7,957,647 B2 * | 6/2011 | Kazawa et al. ................. | 398/75 |
| 7,957,650 B2 * | 6/2011 | Pan et al. ....................... | 398/135 |
| 2005/0163505 A1 * | 7/2005 | Kinoshita et al. .............. | 398/38 |
| 2007/0143645 A1 * | 6/2007 | Haran ............................. | 714/704 |
| 2007/0264031 A1 * | 11/2007 | Dalton ........................... | 398/208 |
| 2007/0274720 A1 * | 11/2007 | Menasco et al. ................ | 398/66 |
| 2008/0050116 A1 * | 2/2008 | Nakaishi et al. ................ | 398/43 |
| 2008/0056714 A1 * | 3/2008 | Konstan ......................... | 398/38 |
| 2009/0010643 A1 * | 1/2009 | DeLew et al. .................. | 398/17 |
| 2009/0080891 A1 * | 3/2009 | Kazawa et al. ................. | 398/79 |
| 2009/0232494 A1 * | 9/2009 | Hehmann et al. .............. | 398/25 |
| 2009/0285581 A1 * | 11/2009 | Kim et al. ...................... | 398/140 |

* cited by examiner

*Primary Examiner* — Agustin Bello
(74) *Attorney, Agent, or Firm* — Kaplan Breyer Schwarz & Ottesen, LLP

(57) ABSTRACT

A passive optical network is disclosed that enables burst mode operation without some of the disadvantages for doing so in the prior art. An embodiment of the present invention comprises a receiver that receives optical signals from transmitters of a plurality of optical network units. For each transmission from an optical network unit, the receiver provides an output signal based on a comparison of the optical signal and a reference voltage that is specific to that optical network unit. A digital-to-analog converter generates the reference voltage in a data rate-independent manner based on information provided to it from the control plane.

18 Claims, 4 Drawing Sheets

PASSIVE OPTICAL NETWORK COMPRISING AN OPTICAL BURST MODE RECEIVER

FIELD OF THE INVENTION

The present invention relates to telecommunications in general, and, more particularly, to optical network equipment.

BACKGROUND OF THE INVENTION

Passive optical networks (PONs) that operate in burst mode are attractive for providing fiber-to-the-premises because, among other reasons, they enable significant equipment sharing between multiple users. Total cost of implementing a fiber-to-the-premises network, therefore, can be reduced.

A burst mode PON typically comprises several Optical Network Units (ONUs) connected to a central office through a shared optical fiber link. These ONUs communicate with the central office using a time-division-multiplexing scheme, wherein the central office allocates a transmission period to one ONU at a time to enable that ONU to transmit upstream data to the central office. In burst mode an ONU transmits its data without waiting for input from another device or waiting for an internal process to terminate before continuing the transfer of data. Since this type of transmission requires the use of transmission bandwidth for only the time while a transmitter is active, the remainder of the transmission bandwidth is available to other transmitters. As a result, a single fiber link can be shared by multiple ONUs.

As the rate at which data is transferred through the network (i.e., the transmission data rate) increases, burst mode operation becomes increasingly difficult. Specifically, as data rates exceed 10 Gbit per second, however, the number of active components in the electronic circuitry required to support such operation becomes increasingly complex, expensive, and power hungry.

One area wherein increased circuit complexity has become particularly problematic is the central office receiver that receives the upstream optical signals from the multiple ONUs. The challenges associated with receiving data at high data rates is exacerbated by the fact that the ONUs connected to the receiver are typically at different distances from the central office. Optical signals propagating through an optical fiber from the different ONUs, therefore, are subject to different losses of signal power due to the physical attributes of the fiber, different bends in the fiber, varied loss at fiber connectors within the span, and the like. In addition, the optical power launched by the transmitters of each ONU can vary significantly based on such factors as the age of the transmitter, efficiency of its optical coupling to the fiber, and differences in the electronics that drive the transmitters. As a result, the range of optical power in the optical signals received by the receiver can vary significantly. The receiver, however, must be able to generate an output signal based on all of these optical signals without incurring significant errors.

SUMMARY OF THE INVENTION

The present invention enables burst mode operation of a passive optical network without some of the costs and disadvantages for doing so in the prior art. Embodiments of the present invention are particularly well-suited for use in optical telecommunications and data communications applications.

Embodiments of the present invention, like the prior art, comprise an optical receiver that is capable of receiving time-division-multiplexed optical signals from a plurality of ONUs. In order to increase the receiver's immunity to noise and other deleterious effects, the receiver includes a comparator that generates an output signal based on a data stream received from an ONU and a generated reference voltage specific to that ONU.

In the prior art, the reference voltage for each ONU is generated directly from the incoming data stream. As the data rate of the received data increases, however, the circuitry necessary to generate a reference voltage from the incoming data stream can become quite complex and expensive to implement. In addition, power consumption of such circuitry increases with its complexity. As a result, generation of a reference voltage directly from an incoming data stream becomes increasingly difficult—particularly for data rates that exceed 10 Gigabits per second.

Unlike the prior art, embodiments of the present invention generate a reference voltage based on a power level set-point for the transmitting ONU. Power level set-points for each ONU are established during a dedicated ONU training period and stored in a database that comprises the look-up table. This database is accessible by the control plane of the passive optical network. A controller, typically located at the central office, reads a value based on the optical power set-point for the ONU and passes a digital bit pattern based on this value to a digital-to-analog converter. Embodiments of the present invention, therefore, operate across both the control layer and the physical layer of the network. The digital-to-analog converter receives the digital bit pattern and generates the reference voltage specific to this ONU. As a result, the generated reference voltage is correlated with the incoming data stream but does not have to be generated directly from it. This obviates the need for complex circuitry to generate the reference voltage. Further, the present invention enables the generation of the reference voltage in a data rate independent manner.

In some embodiments, the present invention comprises a central office interconnected with a plurality of ONUs, wherein the central office comprises an optical receiver that receives optical signals from each the ONUs. The receiver comprises a reference voltage generator that includes a digital-to-analog converter. When the receiver receives an optical signal from an ONU, a digital bit pattern is provided to the digital-to-analog converter by the control plane of the network. The digital bit pattern is based on a power level set-point specific to that ONU. In some embodiments, the digital bit pattern is provided by a controller located at the central office. In some embodiments, the digital bit pattern is the power level set-point and is stored in a look-up table that is accessed by the controller.

An embodiment of the present invention comprises: a first transmitter, wherein the first transmitter is characterized by a first power level set-point; a controller comprising a database that includes a first value, wherein the first value is based on the first power level set-point, and wherein the controller provides a first digital bit pattern that is based on the first value; and a receiver comprising an amplifier and a voltage generator, wherein the voltage generator receives the first digital bit pattern from the controller and generates a first reference voltage based on the first digital bit pattern; wherein the amplifier receives a first electrical signal and the first reference voltage, and wherein the first electrical signal is based on a first optical signal provided by the first transmitter, and wherein the amplifier generates a first output signal based on the first electrical signal and the first reference voltage.

DETAILED DESCRIPTION

Figure 1:
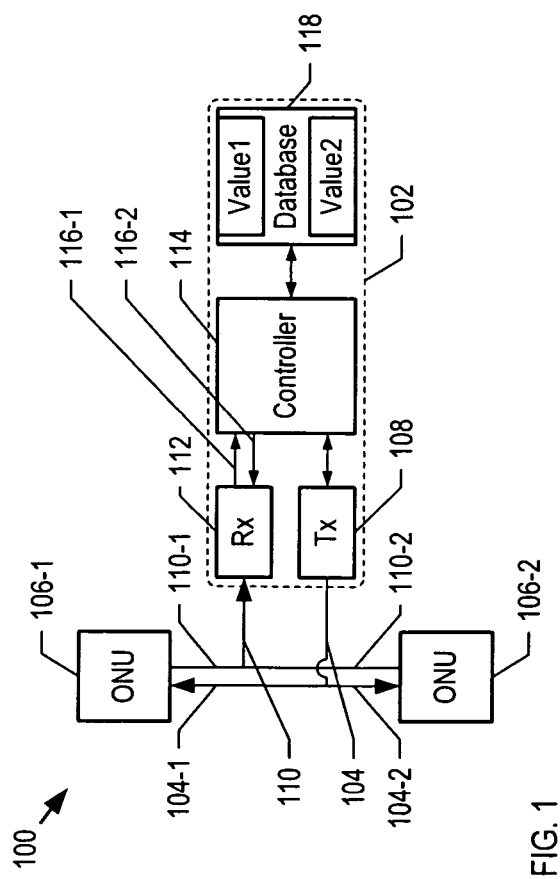
FIG. 1 depicts a schematic diagram of a portion of a telecommunications network in accordance with the illustrative embodiment of the present invention.

FIG. 1 depicts a schematic diagram of a portion of a telecommunications network in accordance with the illustrative embodiment of the present invention. Network 100 comprises central office 102 and optical network units 106-1 and 106-2.

Network 100 operates in a burst mode transmission mode, wherein several ONUs share central office equipment through time-division multiplexing. In typical operation, central office 102 schedules a transmission period for an ONU. During this transmission period, the enabled ONU transmits its upstream data as a burst transmission. In some embodiments, all ONUs transmit their respective optical signals at substantially the same wavelength. In some embodiments, ONUs transmit optical signals at different wavelengths and the receiver is wavelength tunable to enable it to receive these multiple wavelengths.

Central office 102 is a switching station that provides an interface between the long-haul portion of a telecommunications network and local subscribers, such as homes and businesses. A typical central office will serve tens of thousands of local subscribers. Central office 102 comprises transmitter 108, receiver 112, controller 114 and database 118. Central office 102 communicates with each ONU through transmitter 108 and receiver 112.

Transmitter 108 is a conventional source for providing optical signal 104, which comprises time-division multiplexed optical signals 104-1 and 104-2. Central office 102 sends downstream data and control information, such as scheduling commands, to ONUs 106 via transmitter 108. It will be clear to those skilled in the art how to make and use transmitter 108.

Receiver 112 is an optical receiver for receiving upstream data and signals from ONUs 106. Receiver 112 operates in burst-mode, wherein ONUs 106-1 and 106-2 share the receiver and wherein each ONU transmits for only a transmission period that is scheduled by controller 114. Receiver 112 is described in more detail below and with respect to FIG. 2.

ONU 106-1 is located at a first subscriber location and provides conversion of downstream optical signals 104-1 into electrical signals that are usable by premises equipment. In similar fashion, ONU 106-2 is located at a second subscriber location and provides conversion of downstream optical signals 104-2 into electrical signals that are usable by premises equipment. ONU 106-1 and 106-2 (referred to collectively as ONUs 106) also convert electrical signals generated by their associated premises equipment into upstream optical signals 110-1 and 110-2, respectively. In some embodiments, each of ONUs 106 comprises a receiver and transmitter that is dedicated to a single customer. In some embodiments, an ONU may serve more than one customer.

Typically, each ONU interconnected with central office 102 is a different distance from the central office. This leads to a different amount of total signal attenuation along the length of their respective optical fibers. In addition, the source at each ONU may launch a different amount of optical power into its respective optical fiber, for example, due to the transmitter's age or quality of fiber coupling. As a result, the optical power level of transmissions received from different ONUs can vary significantly by the time they reach the central office. Receiver 112 must accommodate these different power levels without incurring significant errors.

Controller 114 is a processing system that, among other functions, monitors network operation, communicates with other central offices, responds to protocol requests, and interfaces with each ONU to which it is connected. As will be discussed in more detail below and with respect to FIGS. 2 and 3, controller 114 also accesses database 118 and provides information pertaining to ONU power levels to receiver 112.

Database 118 is a database that comprises information about each ONU to which central office 102 is connected. Database 118 includes a look-up table that includes Value1 and Value2, which are values corresponding to power level set-points for ONUs 106-1 and 106-2, respectively.

Figure 2:
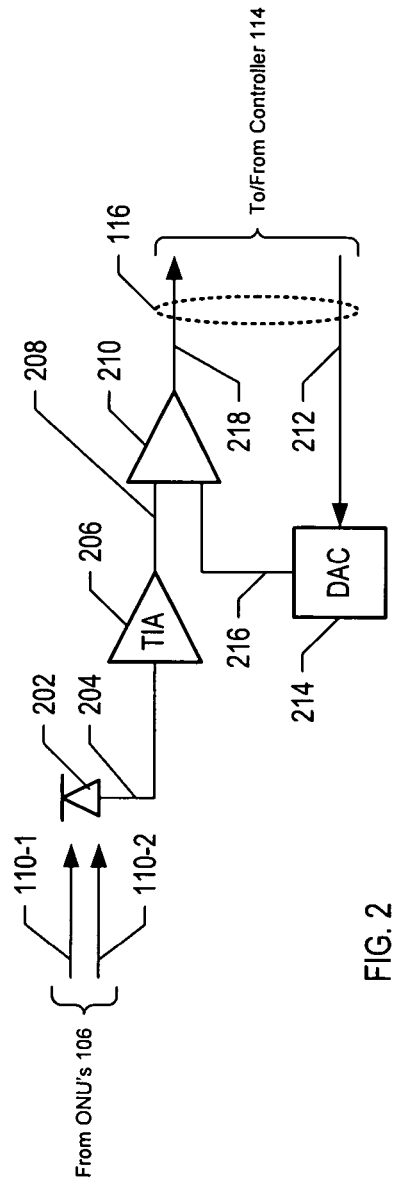
FIG. 2 depicts a schematic drawing of receiver 112 in accordance with the illustrative embodiment of the present invention.

FIG. 2 depicts a schematic drawing of receiver 112 in accordance with the illustrative embodiment of the present invention. Receiver 112 comprises photodetector 202, transimpedance amplifier 206, differential amplifier 210, and digital-to-analog converter 214. Receiver 112 converts optical signals 110-1 and 110-2 into output voltage signal 218.

In order to provide improved noise immunity, receiver 112 includes a comparator that provides an output voltage based on a comparison of electrical signal 208 (which is based on the intensity of one of optical signals 110) with a reference voltage (i.e., reference voltage 216). As a result, it is important that the reference voltage have a suitable magnitude.

In the prior art, a reference voltage for a burst-mode receiver is typically generated based on the signal power of the incoming data. As the transmission rate of communications networks has increased, however, the complexity of the circuitry necessary to provide a suitable reference voltage has become a limiting factor. It is an aspect of the present invention that, since controller 114 schedules the transmission periods for each ONU, it is also capable of providing information that enables the generation of a suitable reference voltage for optical signals generated by each ONU.

Figure 3:
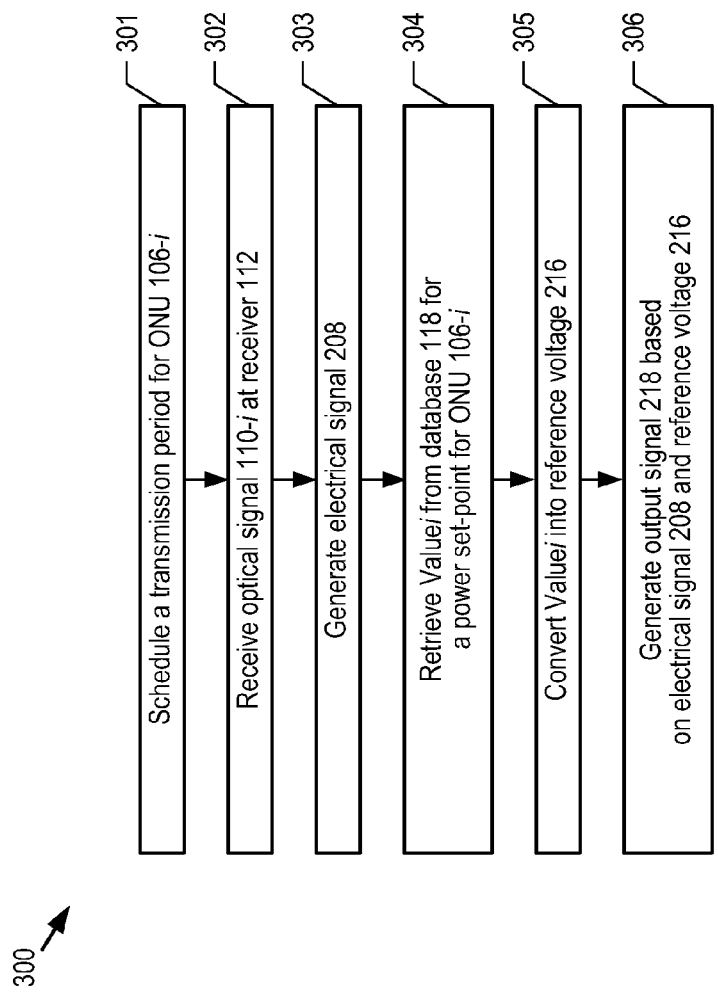
FIG. 3 depicts a method for receiving an optical signal in accordance with the illustrative embodiment of the present invention.

FIG. 3 depicts a method for receiving an optical signal in accordance with the illustrative embodiment of the present invention. In order to more clearly describe the present invention, method 300 is described herein with continuing reference to FIGS. 1 and 2 and reference to FIG. 4.

Method 300 begins with operation 301, wherein controller 114 reserves transmission period 402 for ONU 106-1. As a consequence of controller 114 scheduling this transmission period, controller 114 is aware of the fact that ONU 106-1 is the source optical signal 110-1. As a result, controller 114 is enabled to select information, such as a power level set-point, from database 118 that pertains specifically to ONU 106-1.

At operation 302, receiver 112 receives optical signal 110-1. Optical signal 110-1 is detected by photodetector 202, which generates photocurrent 204. The instantaneous magnitude of photocurrent 204 is based on the instantaneous intensity of optical signal 110-1. Photodetector 202 is a conventional photodetector suitable for detecting light included in optical signal 110-1. It will be clear to one skilled in the art how to make and use photodetector 202.

At operation 303, trans-impedance amplifier 206 converts photocurrent 204 into voltage signal 208. In some embodiments, additional stages of amplification are included in receiver 112. It will be clear to one skilled in the art how to make and use trans-impedance amplifier 206.

Figure 4:
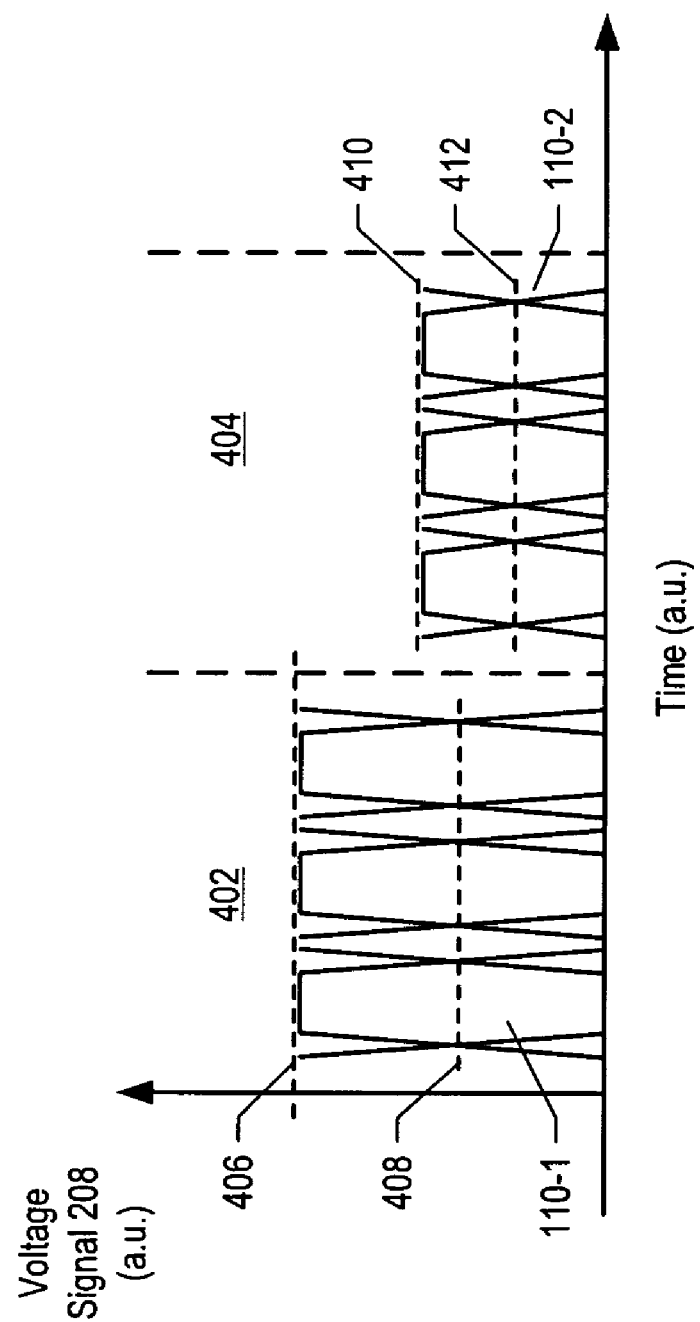
FIG. 4 depicts a voltage signal based on an optical signal received at a burst-mode receiver in accordance with the illustrative embodiment of the present invention.

FIG. 4 depicts a voltage signal based on an optical signal received at a burst-mode receiver in accordance with the illustrative embodiment of the present invention.

Voltage signal 208 is based on optical signal 110. Optical signal 110 comprises optical signals 110-1 and 110-2, which are received in transmission periods 402 and 404, respectively (as scheduled by controller 114). During transmission period 402, voltage signal 208 has a dynamic range that extends from substantially zero intensity to peak voltage 406. Similarly, during transmission period 404, voltage signal 208 has a dynamic range that extends from substantially zero intensity to peak voltage 410. A desirable reference voltage has a magnitude between 40% and 50% of the peak voltage, and is most preferably 50% of the peak voltage. As a result, the preferable reference voltage is reference voltage value 408 during transmission period 402 and reference voltage value 412 during transmission period 404.

At operation 304, controller 114 accesses database 118 to retrieve Value1. Value1 is a digital bit pattern that corresponds to a power level set-point for ONU 106-1. Value1 is predetermined at operation 301. In some embodiments, Value1 is another value that is used to generate a digital bit pattern that corresponds to a power level set-point for ONU 106-1. Controller 114 passes Value1 to receiver 112 as digital signal 212 on signal line 116-2.

At operation 305, Value1 is passed to digital-to-analog converter 214 (hereinafter referred to as DAC 214) as digital signal 212. DAC 214 is a conventional digital-to-analog converter that has suitable output voltage range, resolution, and response time for providing reference voltage 216 at the data rate at which receiver 112 operates. It will be clear to one skilled in the art, after reading this specification, how to specify and use DAC 214. DAC 214 receives digital signal 212 and converts it into an analog voltage (i.e., reference voltage 216) having a magnitude substantially equal to reference voltage value 408.

At operation 306, differential amplifier 210 compares electrical signal 208 and reference voltage 216 and provides output signal 218 on signal line 116-1. Differential amplifier 210 is a conventional differential amplifier suitable for the data rate at which receiver 112 operates. In some embodiments, output signal 218 represents a digital "high" signal when the magnitude of electrical signal 208 is greater than reference voltage value 408 and a digital "low" signal when the magnitude of electrical signal 208 is less than reference voltage value 408. In some embodiments, output signal 218 represents a digital "low" signal when the magnitude of electrical signal 208 is greater than reference voltage value 408 and a digital "high" signal when the magnitude of electrical signal 208 is less than reference voltage value 408.

During transmission period 404, method 300 is repeated for ONU 106-2. Although in the illustrative embodiment, network 100 comprises only two ONUs, it will be clear to one of ordinary skill in the art, after reading this specification, how to make and use alternative embodiments of the present invention wherein network 100 comprises any number of ONUs.

Figure 5:
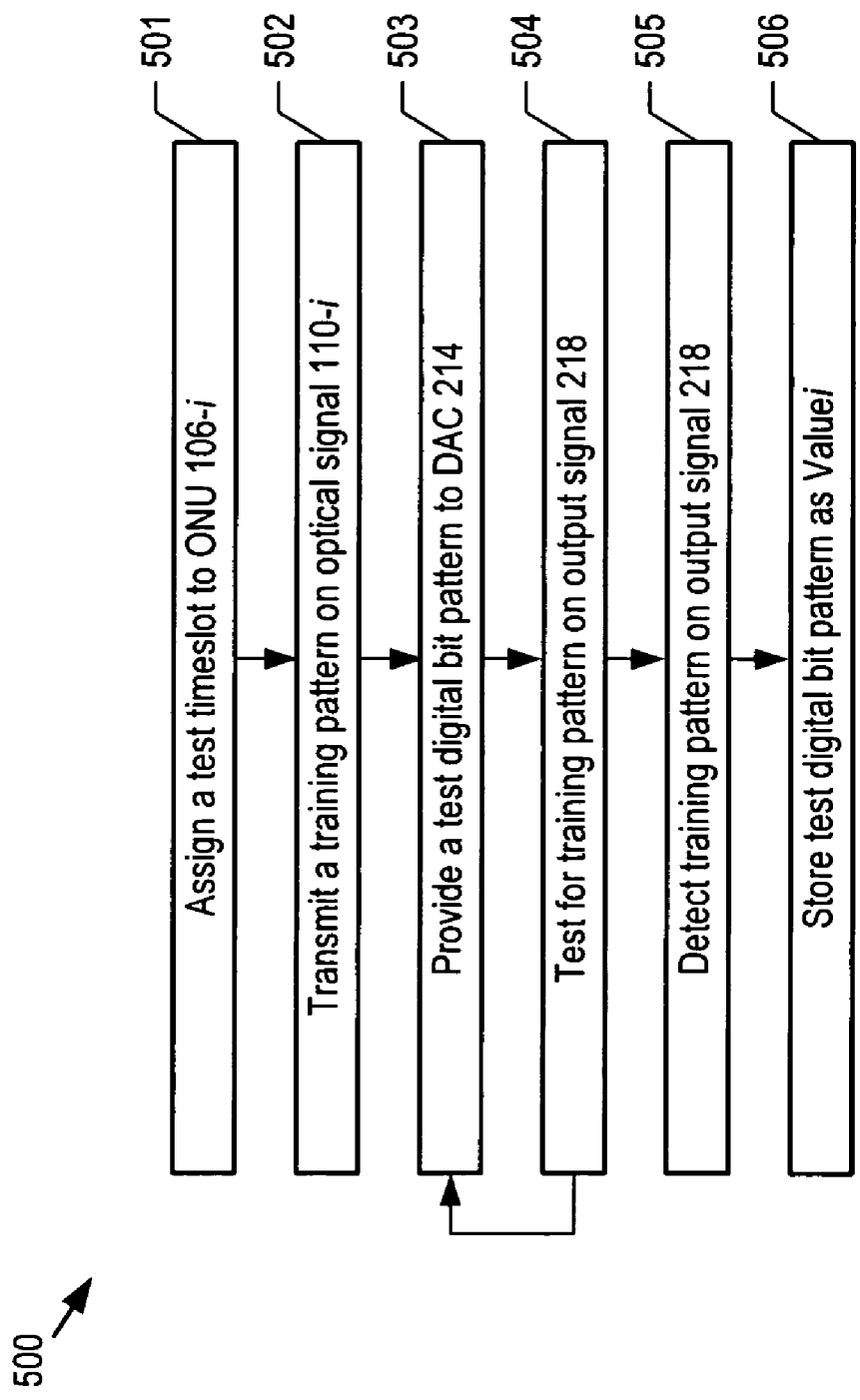
FIG. 5 depicts a method for establishing a value for a power level set-point for an ONU in accordance with the illustrative embodiment of the present invention.

FIG. 5 depicts a method for establishing a value for a power level set-point for an ONU in accordance with the illustrative embodiment of the present invention. Method 500 is described herein using an example of establishing a power level set-point for ONU 106-1. It will be clear to one skilled in the art, after reading this specification, how to apply method 500 to establish a value for a power level set-point for any ONU. It should be noted that method 500 needs to be run only once for each ONU, as long as the peak power level of the transmitter of the ONU remains substantially constant. In some instances, however, the peak power level of the transmitter might change due to aging, damage, perturbation of the optical fiber plant, and the like. In such a case, method 500 can be run again to reset the power level set-point as appropriate.

Method 500 begins with operation 501, wherein controller 114 assigns a testing timeslot to ONU 106-1.

At operation 502, controller 114 transmits control signal 104-2 to ONU 106-1 via transmitter 108. Control signal 104-2 informs ONU 106-1 of a training pattern to be transmitted back to controller 114. ONU 106-1 embeds this training pattern in optical signal 110-1, which is transmitted to controller 114 during the testing timeslot.

At operation 503, controller 114 provides a first test digital bit pattern to DAC 214 as digital signal 212 on signal line 116-2. The first test digital bit pattern is converted into a first test reference voltage by DAC 214.

At operation 504, controller 114 tests for receipt of the training pattern on output signal 218, using the first test reference voltage as the reference voltage. If the training pattern is not successfully received, operations 503 and 504 are repeated with a different test digital bit pattern.

At operation 505, the training pattern is successfully detected.

At operation 506, the test digital bit pattern used to successfully detect the training pattern is stored as Value1.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   (1) a receiver comprising:
      (a) a comparator, the comparator operable to provide a first output signal that has (i) a first digital state when the magnitude of a first electrical signal is greater than a first reference voltage and (ii) a second digital state when the magnitude of the first electrical signal is less than the first reference voltage, wherein the magnitude of the first electrical signal is based on a first optical signal transmitted by a first transmitter to the receiver; and
      (b) a voltage generator, the voltage generator operable to generate the first reference voltage; and
   (2) a controller that is operable to:
      (a) enable the first transmitter to transmit the first optical signal such that the first optical signal includes a first training pattern during a first testing timeslot;
      (b) provide a first test digital bit pattern to the voltage generator, wherein the first reference voltage is based on the first test digital bit pattern during the first training timeslot;
      (c) test the first output signal for presence of the first training pattern;
      (d) change the first test digital bit pattern if the first training pattern is not detected in the first output signal; and (e) store a first value in a database if the first training pattern is detected in the first output signal, the first value being based on the first test digital bit pattern.

2. The apparatus of claim 1 wherein the voltage generator comprises a digital-to-analog converter, and wherein the digital-to-analog converter generates the first reference voltage based on the first test digital bit pattern.

3. The apparatus of claim 1 wherein the comparator is operable to provide a second output signal that has the first digital state when (i) the magnitude of a second electrical signal is greater than a second reference voltage and (ii) the second digital state when the magnitude of the second electrical signal is less than the second reference voltage, wherein the magnitude of the first electrical signal is based on a second optical signal transmitted by a second transmitter to the receiver, and wherein the voltage generator is operable to generate the second reference voltage; and wherein the controller is further operable to:
  (f) enable the second transmitter to transmit the second optical signal such that the second optical signal includes a second training pattern during a second testing timeslot;
  (g) provide a second test digital bit pattern to the voltage generator, wherein the second reference voltage is based on the second test digital bit pattern during the second training timeslot;
  (h) test the second output signal for presence of the second training pattern;
  (i) change the second test digital bit pattern if the second training pattern is not detected in the second output signal; and
  (j) store a second value in a database if the second training pattern is detected in the second output signal, the second value being based on the second test digital bit pattern.

4. The apparatus of claim 3 wherein the controller is further operable to:
  (k) provide the first training pattern to the first transmitter;
  (l) provide the second training pattern to the second transmitter;
  (m) establish a first transmission period and the first training timeslot for the first transmitter; and
  (n) establish a second transmission period and the second training timeslot for the second transmitter.

5. The apparatus of claim 1, wherein the controller, the voltage generator, and the comparator are located at a central office, and wherein the first transmitter is located at a location other than the central office.

6. A receiver for converting a digitally encoded optical signal into a digital electrical signal, wherein the digitally encoded optical signal is characterized by a data rate, the receiver comprising:
  a voltage generator operable to provide a first reference voltage to a comparator, wherein during a first transmission period the first reference voltage is based on a first value stored in a database, and wherein during a first training timeslot the first reference voltage is based on a first digital signal that is data rate independent; and
  the comparator, wherein the comparator is operable to generate a first output signal, the first output signal having (i) a first digital state when the magnitude of a first electrical signal is greater than the first reference voltage and (ii) a second digital state when the magnitude of the first electrical signal is less than the first reference voltage, and wherein the magnitude of the first electrical signal is based on a first optical signal provided by a first transmitter.

7. The receiver of claim 6 further comprising a controller that is operable to:
  (a) establish a first training timeslot for the first transmitter;
  (b) provide a first training pattern to the first transmitter;
  (c) enable the first transmitter to transmit the first optical signal such that the first optical signal includes the first training pattern during the first training timeslot;
  (d) provide the first digital signal to the voltage generator during the first training timeslot;
  (e) test the first output signal for presence of the first training pattern;
  (f) change the first digital signal if the first training pattern is not detected in the first output signal;
  (g) store the first value in a database if the first training pattern is detected in the first output signal, the first value being based on the first digital signal; and
  (h) retrieve the first value from the database and provide the first value to the voltage generator during the first transmission period.

8. The receiver of claim 6 wherein the voltage generator is further operable to provide a second reference voltage to the amplifier, and wherein during a second transmission period the second reference voltage is based on a second value stored in the database, and further wherein during a second training timeslot the second reference voltage is based on a second digital signal that is data rate independent; and
  wherein the comparator provides a second output signal, the second output signal having (i) the first digital state when the magnitude of a second electrical signal is greater than the second reference voltage and (ii) the second digital state when the magnitude of the second electrical signal is less than the second reference voltage, and wherein the magnitude of the second electrical signal is based on a second optical signal provided by a second transmitter.

9. The receiver of claim 8 wherein the first transmitter is characterized by a first power level set-point and the second transmitter is characterized by a second power level set-point, and wherein the first value, the first digital signal, and the first power level set-point are correlated, and further wherein the second value, the second digital signal, and the second power level set-point are correlated.

10. A method comprising:
  enabling a first transmitter to transmit a first optical signal that comprises a first training pattern during a first testing timeslot;
  providing a first reference voltage to a comparator, the first reference voltage being based on a first test digital bit pattern during the first training timeslot;
  providing a first electrical signal having a first magnitude that is based on the first optical signal;
  providing a first output signal, wherein the comparator provides the first output signal such that it has (i) a first digital state when the first magnitude is greater than the first reference voltage and (ii) a second digital state when the first magnitude is less than the first reference voltage;
  testing the first output signal for presence of the first training pattern;
  changing the first test digital bit pattern if the first training pattern is not detected in the first output signal; and
  storing a first value in a database if the first training pattern is detected in the first output signal, the first value being based on the first test digital bit pattern.

11. The method of claim 10 further comprising:
  establishing a first transmission period and the first testing timeslot; and providing the first reference voltage such that it is based on the first value during the first transmission period.

12. The method of claim 9 further comprising communicating the first training pattern to the first transmitter.

13. The method of claim 9 further comprising:
enabling the second transmitter to transmit a second optical signal that comprises a second training pattern during a second testing timeslot;
providing a second reference voltage to the comparator, the second reference voltage being based on a second test digital bit pattern during the second training timeslot;
providing a second electrical signal having a second magnitude that is based on the second optical signal;
providing a second output signal, wherein the comparator provides the second output signal such that it has (i) the first digital state when the second magnitude is greater than the second reference voltage and (ii) the second digital state when the second magnitude is less than the second reference voltage;
testing the second output signal for presence of the second training pattern;
changing the second test digital bit pattern if the second training pattern is not detected in the second output signal; and
storing a second value in the database if the second training pattern is detected in the second output signal, the second value being based on the second test digital bit pattern.

14. The method of claim 13 further comprising:
establishing a second transmission period and the second testing timeslot; and
providing the second reference voltage such that it is based on the second value during the second transmission period.

15. A method for converting a digitally encoded optical signal into a digital electrical signal, wherein the digitally encoded optical signal is characterized by a data rate, the method comprising:
providing a first reference voltage to a comparator, wherein during a first transmission period the first reference voltage is based on a first value stored in a database, and wherein during a first training timeslot the first reference voltage is based on a first digital signal that is data rate independent;
providing a first electrical signal having a first magnitude that is based on the intensity of a first optical signal provided by a first transmitter; and
providing a first output signal from the comparator, wherein the first output signal has (i) a first digital state when the first magnitude is greater than the first reference voltage and (ii) a second digital state when the first magnitude is less than the first reference voltage.

16. The method of claim 15 further comprising establishing the first value by operations comprising:
communicating a first training pattern to the first transmitter;
enabling the first transmitter to transmit the first optical signal such that it comprises the first training pattern during the first testing timeslot;
providing the first reference voltage such that the first reference voltage is based on the first digital signal;
testing the first output signal for presence of the first training pattern;
changing the first digital signal if the first training pattern is not detected in the first output signal; and
storing the first value in the database if the first training pattern is detected in the first output signal.

17. The method of claim 15 further comprising:
providing a second reference voltage to the comparator, wherein during a second transmission period the second reference voltage is based on a second value stored in the database, and wherein during a second training timeslot the second reference voltage is based on a second digital signal that is data rate independent;
providing a second electrical signal having a second magnitude that is based on the intensity of a second optical signal provided by a second transmitter; and
providing a second output signal from the comparator, wherein the second output signal has the first digital state when the second magnitude is greater than the second reference voltage and the second digital state when the second magnitude is less than the second reference voltage.

18. The method of claim 17 further comprising establishing the second value by operations comprising:
communicating a second training pattern to the second transmitter;
enabling the second transmitter to transmit the second optical signal such that it comprises the second training pattern during the second testing timeslot;
providing the second reference voltage such that the second reference voltage is based on the second digital signal;
testing the second output signal for presence of the second training pattern;
changing the second digital signal if the second training pattern is not detected in the second output signal; and
storing the second value in the database if the second training pattern is detected in the second output signal.

* * * * *